(12) United States Patent
Chang

(10) Patent No.: US 6,298,887 B1
(45) Date of Patent: Oct. 9, 2001

(54) WOOD PLANING MACHINE WITH AN AUTOMATIC CHAIN TENSIONER DEVICE

(75) Inventor: Chiu-Tsun Chang, Taichung (TW)

(73) Assignee: P & F Brother Industrial Corporation, Taichung (TW)

( * ) Notice: Subject to any disclaimer, the term of this patent is extended or adjusted under 35 U.S.C. 154(b) by 0 days.

(21) Appl. No.: 09/664,310

(22) Filed: Sep. 18, 2000

(51) Int. Cl.$^7$ ........................................................ B27C 1/00
(52) U.S. Cl. ........................ 144/117.1; 144/114.1; 144/130; 254/133 R; 254/414
(58) Field of Search .................... 144/114.1, 117.1, 144/129, 130; 254/408, 413, 414, 133 R

(56) References Cited

U.S. PATENT DOCUMENTS

| | | | |
|---|---|---|---|
| 2,642,902 | * | 6/1953 | Carey ..................................... 144/129 |
| 4,456,042 | * | 6/1984 | Clark et al. ......................... 144/117.1 |

\* cited by examiner

Primary Examiner—W. Donald Bray
(74) Attorney, Agent, or Firm—Baker Botts L.L.P.

(57) ABSTRACT

A wood planing machine includes a machine base having left and right mounting short sides, and feed-in and take-out long sides. Left and right pairs of posts are fixed on a top surface of the machine base at the left and right mounting short sides, respectively. A cutter carriage is disposed above the machine base, and has opposite end portions mounted respectively, vertically and movably on the posts. Left and right threaded rods are mounted respectively and rotatably on the mounting short sides of the machine base such that the threaded rods are disposed respectively between the left and right pairs of posts, and extend threadedly through opposite end portions of the cutter carriage for moving the cutter carriage along the posts. Two sprockets are sleeved respectively and fixedly on the left and right threaded rods. A chain has a front chain section and a rear chain section, and engages the sprockets so as to rotate the left and right threaded rods synchronously with each other. A chain tensioner device includes a pushing piece disposed movably inside the chain, and a biasing unit for biasing the pushing piece to contact and move the front chain section away from the rear chain section.

7 Claims, 7 Drawing Sheets

WOOD PLANING MACHINE WITH AN AUTOMATIC CHAIN TENSIONER DEVICE

BACKGROUND OF THE INVENTION

1. Field of the Invention

The invention relates to a wood planing machine, more particularly to a wood planing machine provided with an automatic chain tensioner device.

2. Description of the Related Art

Referring to FIGS. 1 and 2, a conventional wood planing machine 10 is shown to include an elongated machine base 14, left and right pairs of posts 16, a cutter carriage 12, vertical left and right threaded rods 11, two sprockets 111, an endless transmission chain 13, and a chain tensioner device.

As illustrated, the machine base 14 has opposed left and right mounting short sides 140, and opposed feed-in and take-out long sides 141. The left and right pairs of posts 16 are fixed on the machine base 14 at the left and right mounting short sides 141, respectively. The cutter carriage 12 is disposed above the machine base 14, and has opposite end portions mounted respectively, vertically and movably on the left and right pairs of posts 16. The threaded rods 11 are mounted respectively and rotatably on the left and right mounting short sides 140 of the machine base 14 such that the threaded rods 11 are disposed respectively between the left and right pairs of posts 16, and extend threadedly through the opposite end portions of the cutter carriage 12. The sprockets 111 are disposed below the machine base 14 and are sleeved respectively and fixedly on lower end portions of the left and right threaded rods 11. The chain 13 is disposed below the machine base 14 and engages the sprockets 111 so as to rotate the left and right threaded rods 11 synchronously for moving the cutter carriage 12 along the posts 16 when the threaded rods 11 rotate on the machine base, thereby adjusting the height of the carriage 12 relative to the machine base 14. The chain 13 has front and rear chain sections 131,132 disposed respectively adjacent to the feed-in and take-out long sides 141 of the machine base 14.

The chain tensioner device includes an elongated horizontal rod 15 disposed below and pivoted to the machine base 14 by means of a pivot bolt 152 in such a manner that the rod 15 is located between the front and rear chain sections of the chain 13, and a pair of gears 151 which are mounted respectively and rotatably on two opposite end portions of the rod 15 and which engage respectively the front and rear chain sections 131,132 under tension when one of the threaded rods 11 is rotated.

One disadvantage that results from the use of the aforesaid conventional wood planing machine resides in that, in order to provide the tensioning effect, the rod 15 is locked on the machine base 14 by the pivot bolt 152, which may loosen due to long term use, thereby adversely affecting the chain tensioning ability.

SUMMARY OF THE INVENTION

Therefore, the object of this invention is to provide a wood planing machine which is provided with an automatic chain tensioner device which is clear of the aforementioned drawback that results from the use of the conventional wood planing machine.

Accordingly, the wood planing machine of the present invention includes an elongated machine base, left and right pairs of posts, a cutter carriage, vertical left and right threaded rods, two sprockets, an endless transmission chain, and a chain tensioner device. The machine base has a top surface, opposed left and right mounting short sides, and opposed feed-in and take-out long sides. The feed-in long side is disposed in front of the take-out long side. The left and right pairs of posts are fixed on the top surface of the machine base at the left and right mounting short sides, respectively. The cutter carriage is disposed above the machine base, and has opposite end portions mounted respectively, vertically and movably on the left and right pairs of posts. The left and right threaded rods are mounted respectively and rotatably on the left and right mounting short sides of the machine base such that the threaded rods are disposed respectively between the left and right pairs of posts, and extend threadedly through the opposite end portions of the cutter carriage for moving the cutter carriage along the posts when the threaded rods rotate on the machine base, thereby adjusting the height of the cutter carriage relative to the machine base. The sprockets are sleeved respectively and fixedly on the left and right threaded rods. The transmission chain engages the sprockets so as to rotate the left and right threaded rods synchronously with each other. The chain has a front chain section that is disposed adjacent to the feed-in long side of the machine base, and a rear chain section that is disposed adjacent to the take-out long side of the machine base. The chain tensioner device includes a movable pushing piece and a guiding unit. The pushing piece is disposed movably inside the chain. The guiding unit guides the pushing piece to move horizontally between the front and rear chain sections of the chain. A biasing unit biases the pushing piece to contact and move the front chain section away from the rear chain section, thereby tensioning the chain.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 3:
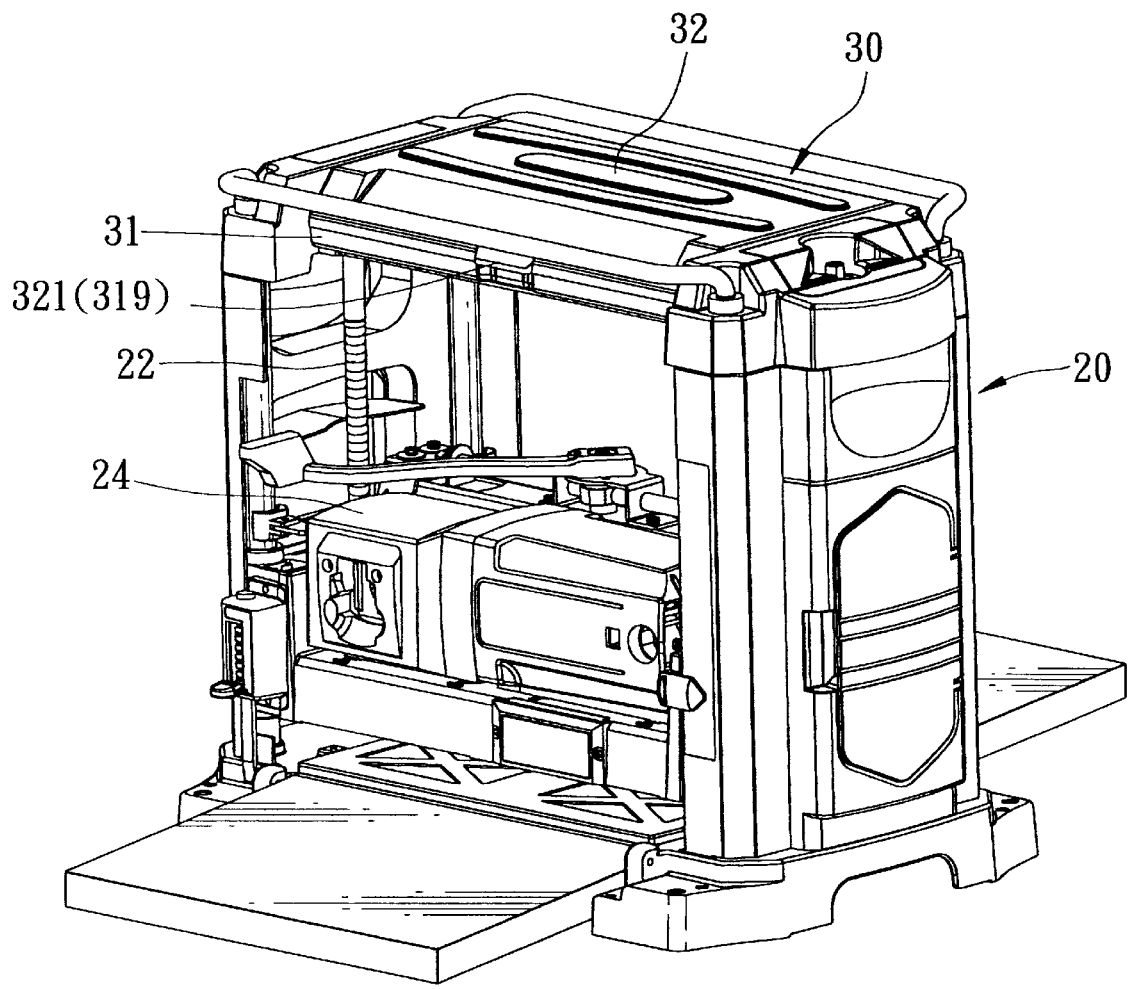
FIG. 3 is a perspective schematic view of the preferred embodiment of a wood planing machine of the present invention provided with an automatic chain tensioner device.
Figure 4:
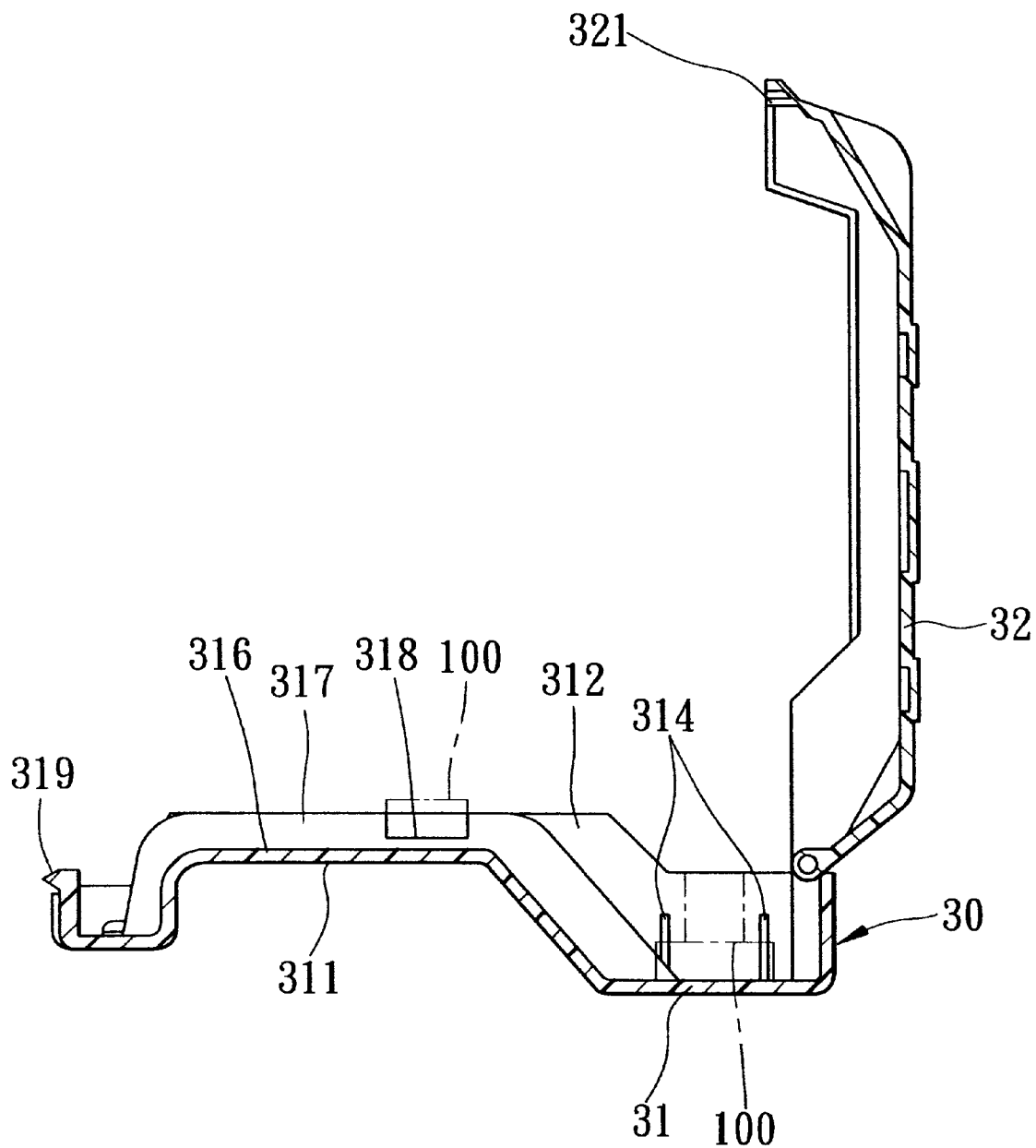
FIG. 4 is a partly exploded perspective schematic view of the preferred embodiment, in which a movable pushing piece of the chain tensioner device is removed from a guiding unit.

Referring to FIGS. 3 and 4, the preferred embodiment of a wood planing machine of this invention is shown to include an elongated machine base 20, left and right pairs of posts 22, a cutter carriage 23, vertical left and right threaded rods 21, two sprockets 211, an endless transmission chain 24, and a chain tensioner device.

As illustrated, the machine base 20 has a top surface 203, opposed left and right mounting short sides 201, and opposed feed-in and take-out long sides 202. The feed-in long side 202 is disposed in front of the take-out long side 202.

The left and right pairs of posts 22 are fixed on the top surface 203 of the machine base 20 at the left and right mounting short sides 201, respectively.

The cutter carriage 23 is disposed above the machine base 20, and has opposite end portions mounted respectively, vertically and movably on the left and right pairs of posts 22 for sliding movement along the posts 31.

The threaded rods 21 are mounted respectively and rotatably on the left and right mounting short sides 201 of the machine base 20 such that the threaded rods 21 are disposed respectively between the left and right pairs of posts 22, and extend threadedly through the opposite end portions of the cutter carriage 23 for moving the cutter carriage 23 along the posts 22 when the threaded rods 21 rotate on the machine base 20, thereby adjusting the height of the cutter carriage 23 relative to the machine base 20.

The sprockets 211 are sleeved respectively and fixedly on the left and right threaded rods 21 above the cutter carriage 23.

The transmission chain 24 engages the sprockets 211 so as to rotate the threaded rods 21 synchronously with each other, and has a front chain section 240 that is disposed adjacent to the feed-in long side 202 of the machine base 20, and a rear chain section 241 that is disposed adjacent to the take-out long side 202 of the machine base 20.

The chain tensioner device includes a movable pushing piece 30, a guiding unit, and a biasing unit. The pushing piece 30 is disposed movably inside the chain 24 in such a manner that the guiding unit guides the pushing piece 30 to move horizontally between the front and rear chain sections 240,241 of the chain 24. The biasing unit biases the pushing piece 30 to contact and move the front chain section 240 away from the rear chain section 241, thereby tensioning the chain 24.

In the preferred embodiment, the guiding unit includes a horizontal top plate 26 and a horizontal disc 27. The horizontal top plate 26 is disposed fixedly on upper end portions of the posts 22 under the chain 24. The horizontal disc 27 is fixed on a top surface of the top plate 26, and has two threaded holes 271. Two opposed left and right slide slots 31 are formed through the pushing piece 30. The slide slots 31 extend in a direction perpendicular to the rear chain section 241 of the chain 24. Two headed vertical bolts 32 extend respectively through the slide slots 31 in the pushing piece 30 and engage the threaded holes 271 in the disc 27, thereby guiding the pushing piece 30 to move in the direction perpendicular to the rear chain section 241 of the chain 24.

Figure 5:
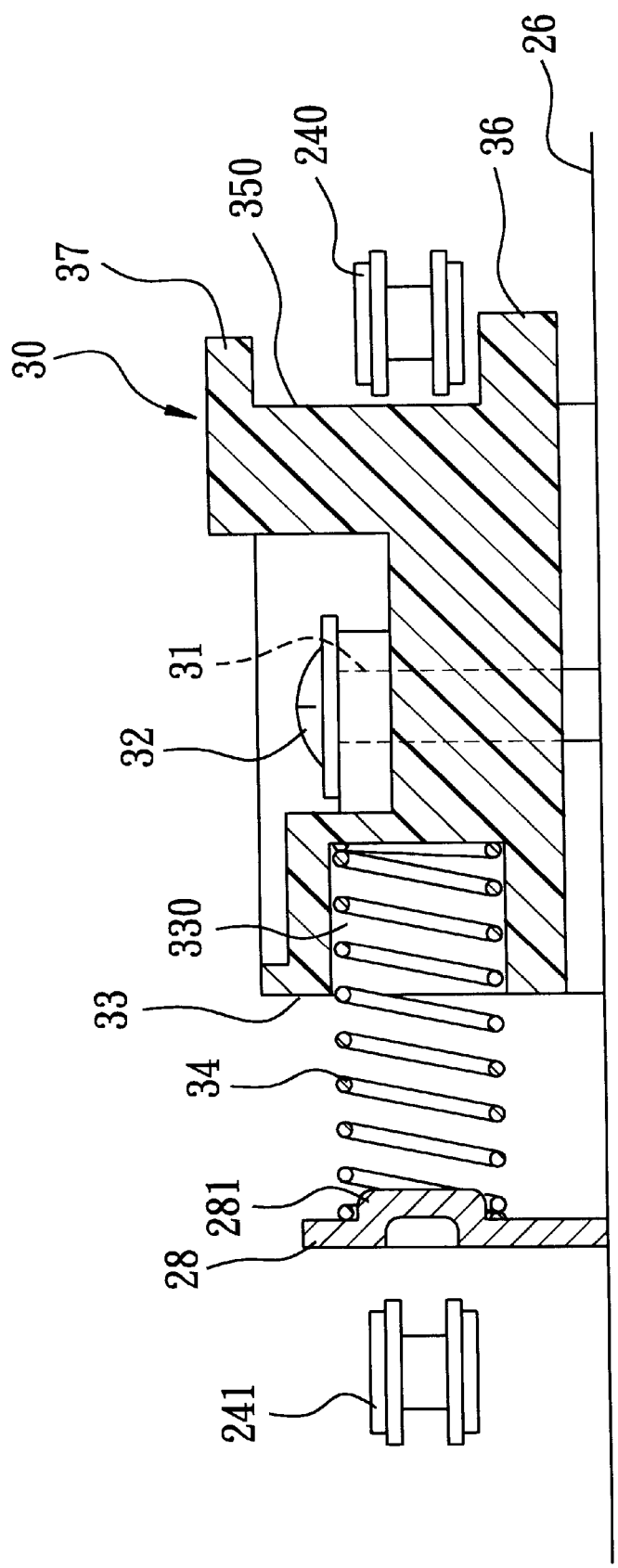
FIG. 5 is a sectional view of the chain tensioner device employed in the preferred embodiment.
Figure 6:
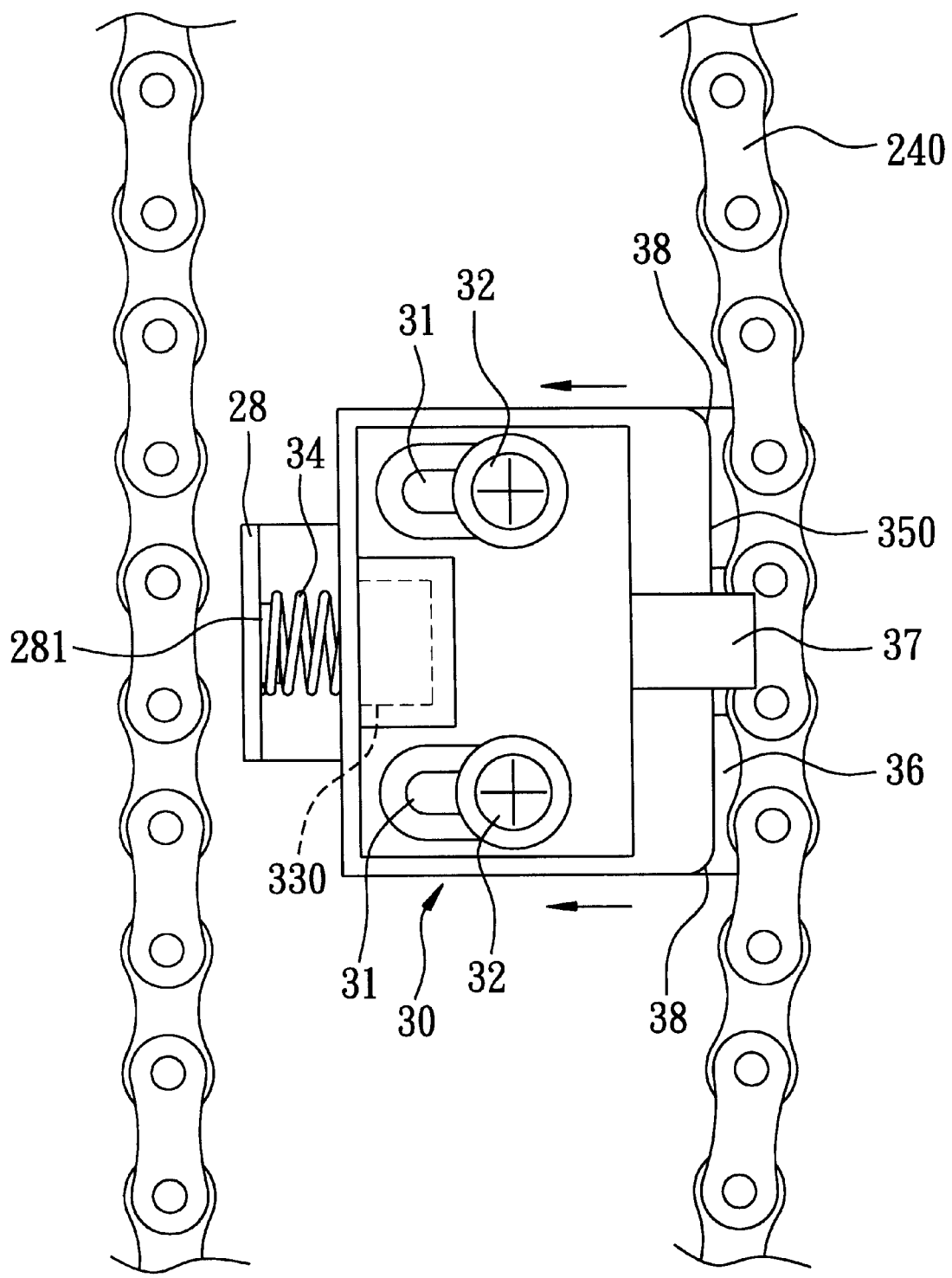
FIG. 6 is a fragmentary top view of the preferred embodiment, illustrating a state where the chain is not pushed by the chain tensioner device.
Figure 7:
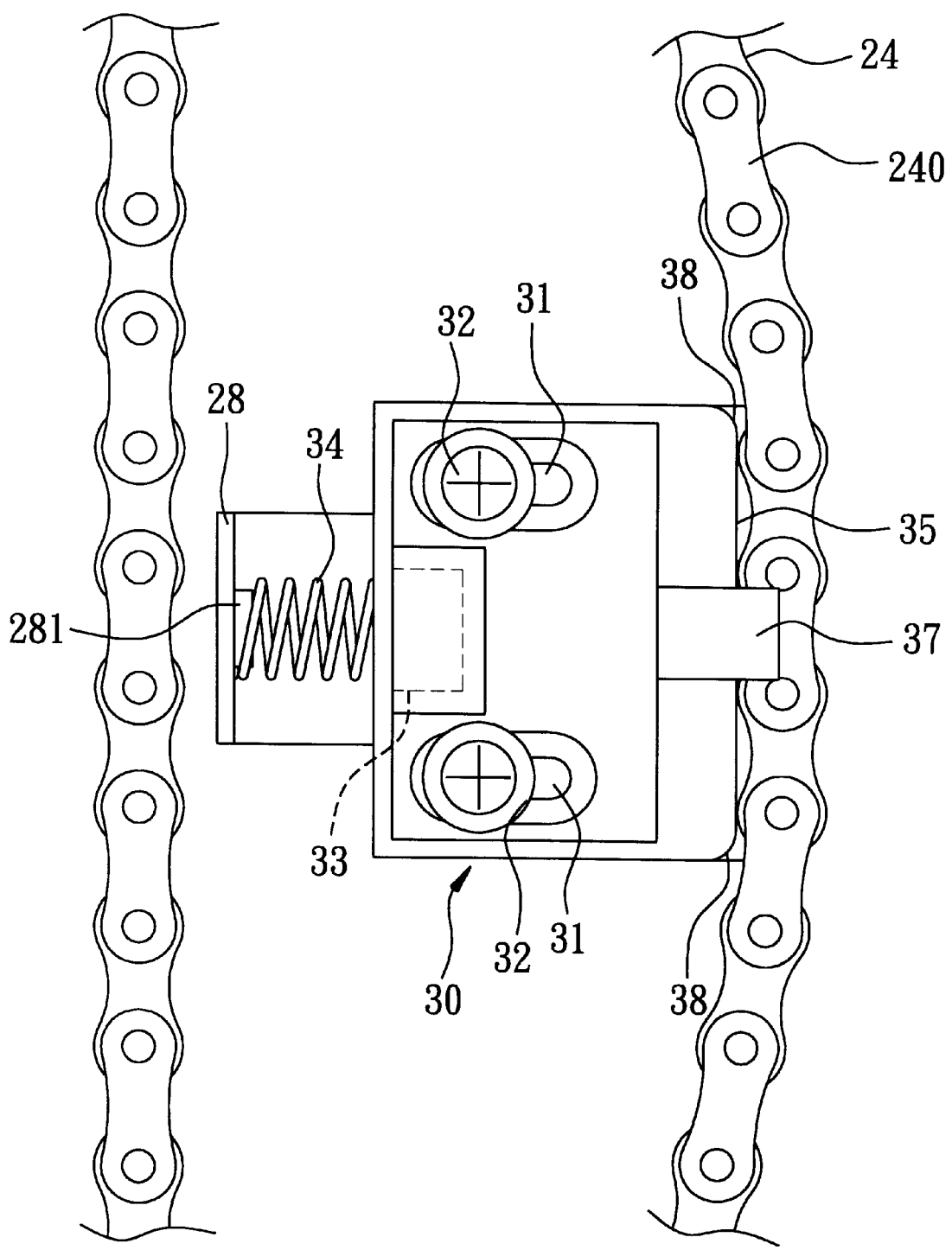
FIG. 7 is a fragmentary top view of the preferred embodiment, illustrating a state where the chain is pushed by the chain tensioner device.
Figure 1:
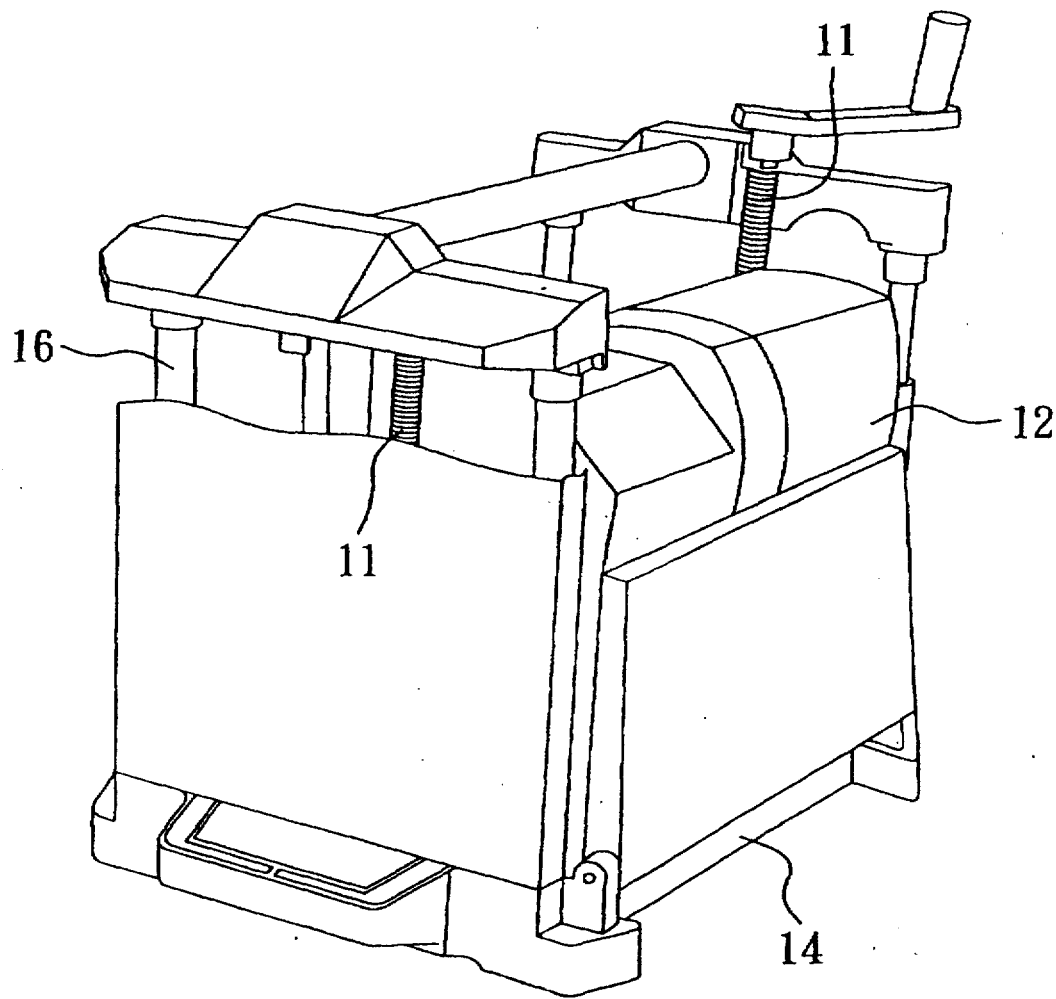
Figure 2:
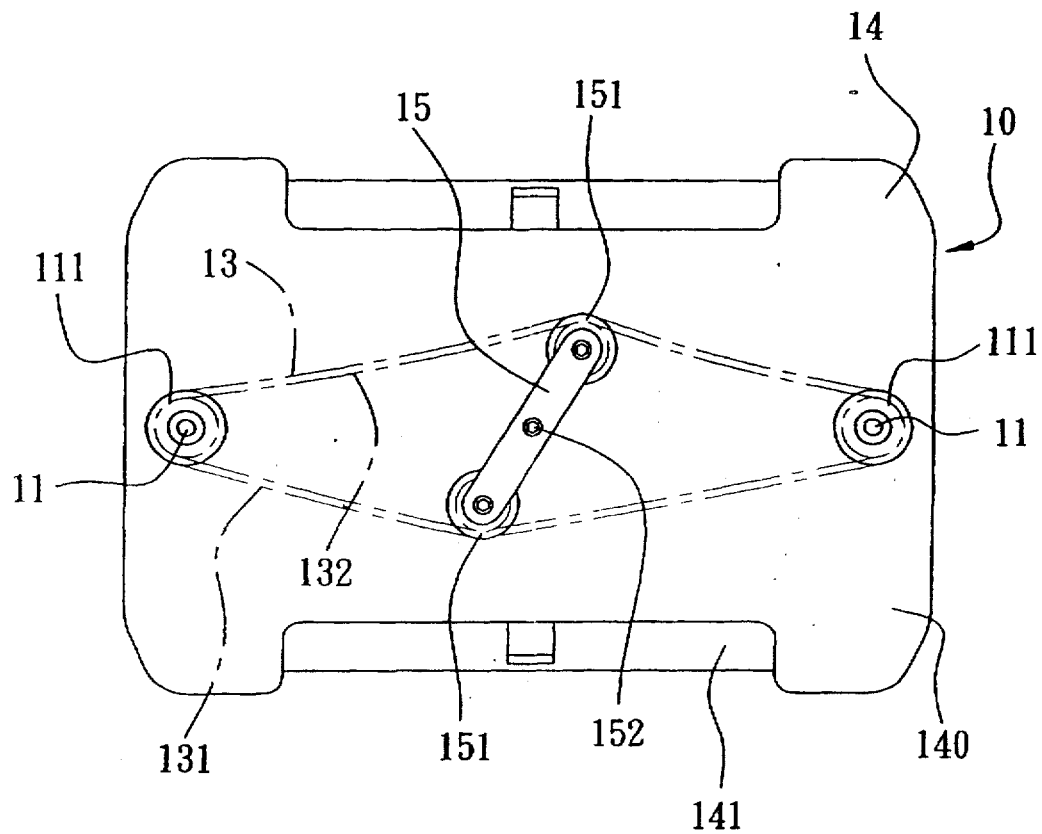
Figure 3:
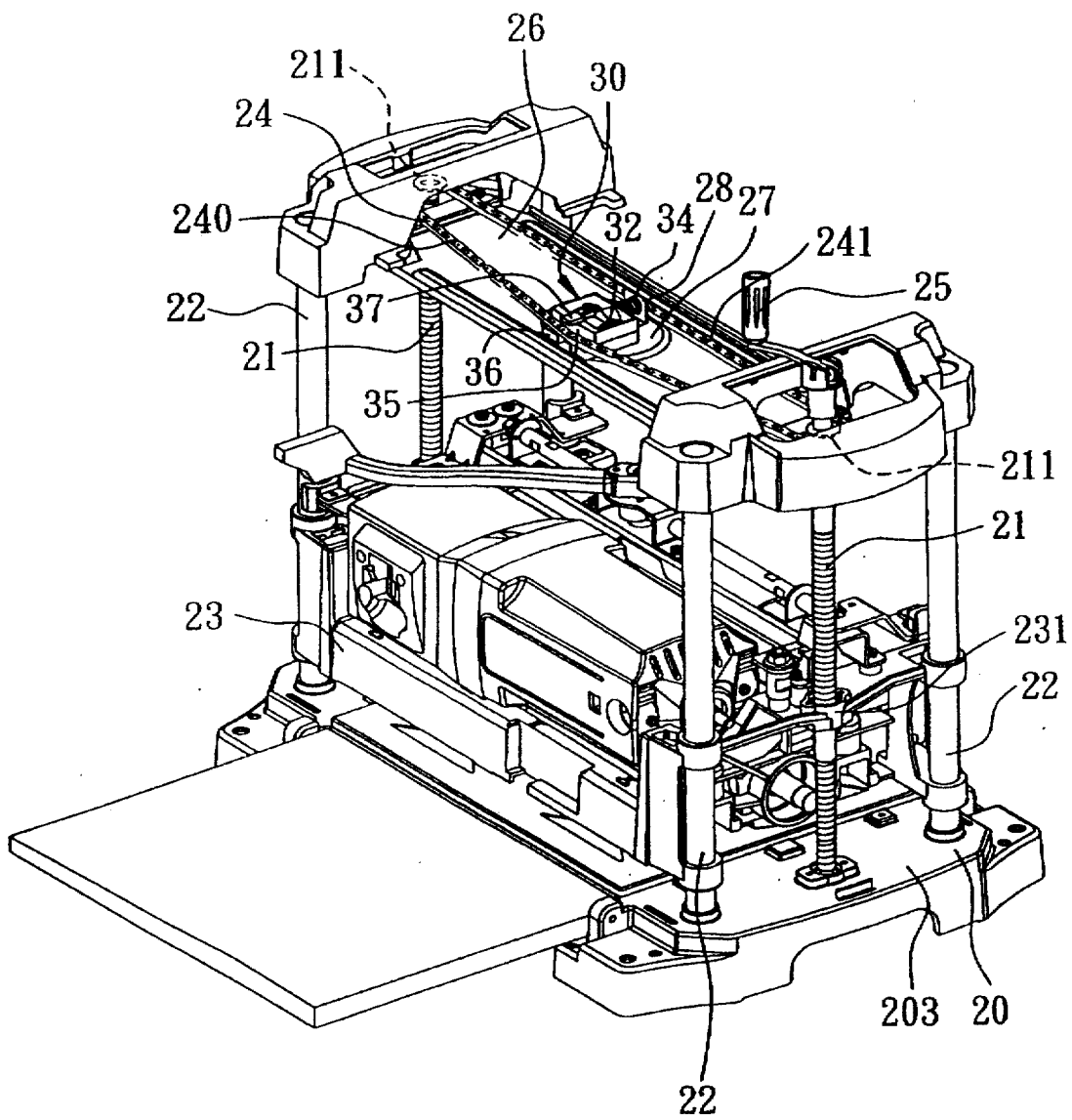
Figure 4:
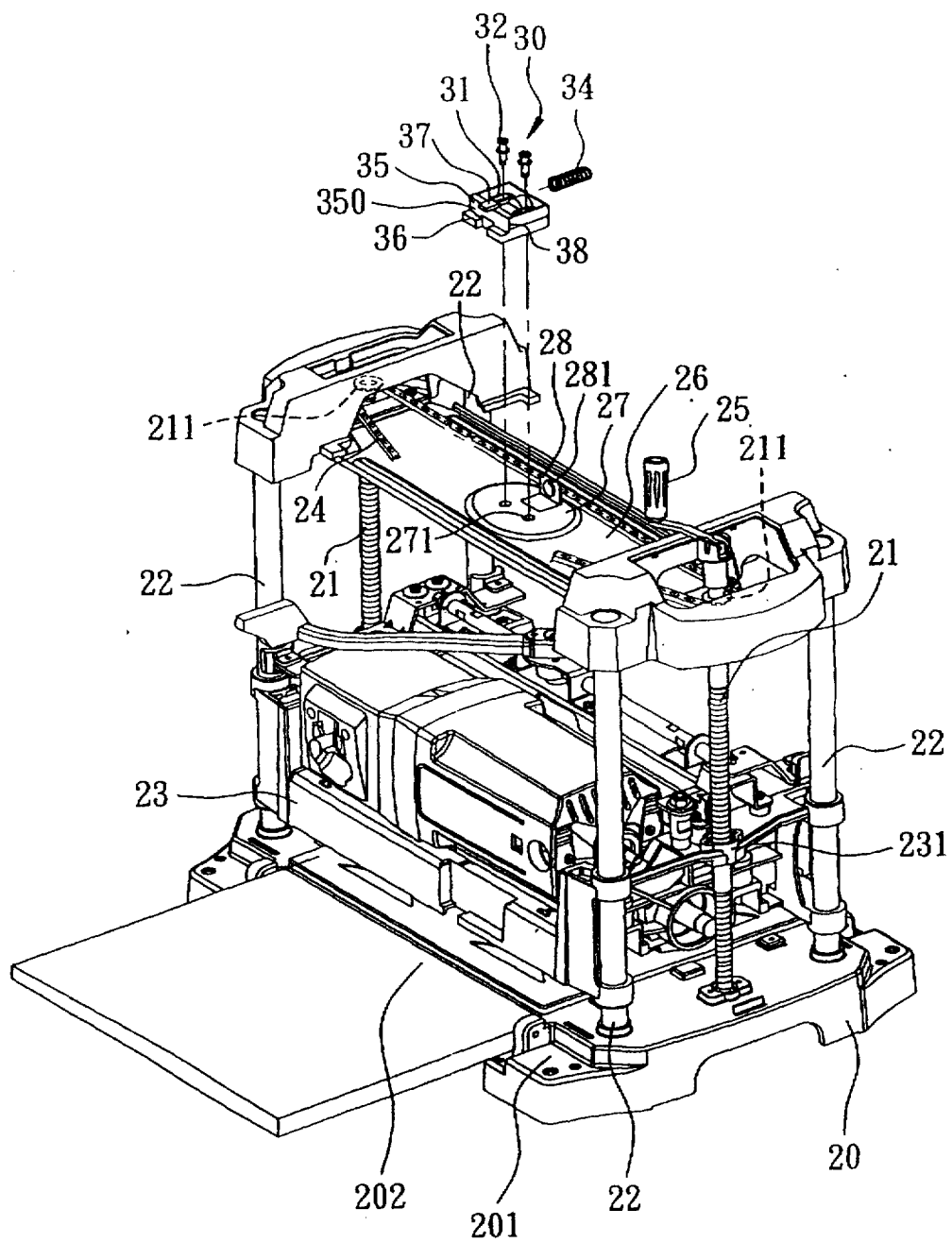

Referring to FIGS. 5, 6 and 7, the pushing piece 30, preferably, has a vertical rear end surface 33 that is formed with a spring-retaining recess 330, and a vertical front end surface 35 (see FIG. 4) that is formed with an open-ended chain-engaging slot 350, through which the front chain section 240 extends. The biasing unit includes a pressed vertical plate 28, and a coiled compression spring 34. The vertical plate 28 is formed integrally on the disc 27, and has an integral projection 281 that extends therefrom in a direction toward the front chain section 240. The compression spring 34 has a front end that is accommodated within the spring-retaining recess 330 in the pushing piece 30, and a rear end that is sleeved on the projection 281 of the vertical plate 28 so as to bias the pushing piece 30 forward, thereby tensioning the chain 24, as best shown in FIG. 7.

The pushing piece 30 further has a horizontal upper protruding plate 37 that extends integrally and forwardly from an upper end of the front end surface 35 of the pushing piece 30, and two aligned horizontal lower protruding plates 36 that extend integrally and forwardly from a lower end of the front end surface 35 of the pushing piece 30 and that are located on two sides of the upper protruding plate 37, thereby defining the chain-engaging slot 350 between the upper protruding plate 37 and the lower protruding plates 36.

Note that the front end surface 35 of the pushing piece 30 is formed with left and right beveled corners 38 (see FIG. 4) that are disposed at two ends of the chain-engaging slot 350, thereby facilitating engagement between the chain 24 and the chain-engaging slot 350.

A rotary lever 25 (see FIG. 4) is fixed to an upper end of the right threaded rod 21 for rotating the left and right threaded rods 21 synchronously.

Referring to FIG. 3, a cutter device (not shown) is mounted rotatably on the cutter carriage 23 in a known manner. A carriage locking member is provided on the cutter carriage and is operably connected to the left and right pairs of posts 22 for fastening thereto after height adjustment of the cutter carriage 23 by virtue of rotation of the right threaded rod 21. Since the structures of the cutter device and the carriage locking member are not pertinent to the present invention, a detailed description thereof will be omitted herein for the sake of brevity.

With this invention thus explained, it is apparent that numerous modifications and variations can be made without departing from the scope and spirit of this invention. It is therefore intended that this invention be limited only as indicated in the appended claims.

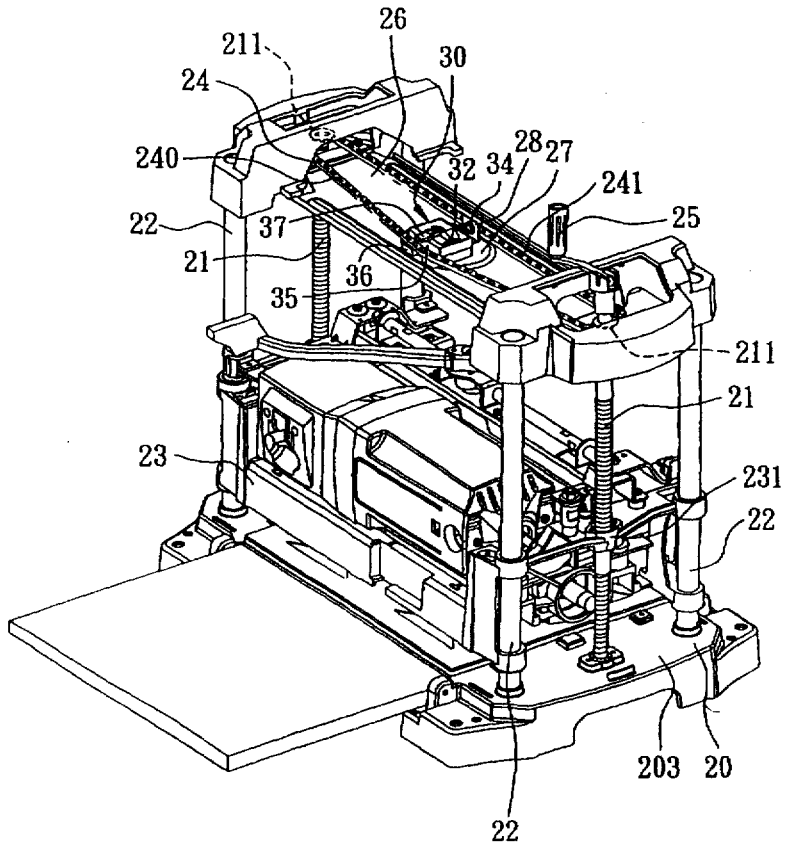

I claim:

1. A wood planing machine comprising:

an elongated machine base having a top surface, opposed left and right mounting short sides, and opposed feed-in and take-out long sides, said feed-in long side being disposed in front of said take-out long side;

left and right pairs of posts fixed on said top surface of said machine base at said left and right mounting short sides, respectively;

a cutter carriage disposed above said machine base, and having opposite end portions mounted respectively, vertically and movably on said left and right pairs of posts;

vertical left and right threaded rods mounted respectively and rotatably on said left and right mounting short sides of said machine base such that said drive rods are disposed respectively between said left and right pairs of posts and extend threadedly through said opposite end portions of said cutter carriage for moving said cutter carriage along said posts when said threaded rods rotate on said machine base, thereby adjusting height of said cutter carriage relative to said machine base;

two sprockets sleeved respectively and fixedly on said left and right threaded rods;

an endless transmission chain engaging said sprockets so as to rotate said left and right threaded rods synchronously with each other, said chain having a front chain section that is disposed adjacent to said feed-in long side of said machine base, and a rear chain section that is disposed adjacent to said take-out long side of said machine base; and a chain tensioner device including
   a movable pushing piece disposed movably inside said chain,
   a guiding unit for guiding said pushing piece to move horizontally between said front and rear chain sections of said chain, and
   a biasing unit for biasing said pushing piece to contact and move one of said front and rear chain sections away from the other one of said front and rear chain sections, thereby tensioning said chain.

2. The wood planing machine as defined in claim 1, wherein said biasing unit biases said pushing piece to contact and move said front chain section away from said rear chain section.

3. The wood planing machine as defined in claim 2, wherein said guiding unit includes:
   a horizontal top plate disposed fixedly on upper end portions of said posts under said chain;
   a horizontal disc fixed on a top surface of said top plate and having two threaded holes;
   two opposed left and right slide slots formed through said pushing piece and extending in a direction perpendicular to said rear chain section; and
   two headed vertical bolts extending respectively through said slide slots in said pushing piece and engaging said threaded holes in said disc, thereby guiding said pushing piece to move in the direction perpendicular to said rear chain section.

4. The wood planing machine as defined in claim 3, wherein said pushing piece has a vertical rear end surface that is formed with a spring-retaining recess, and a vertical front end surface that is formed with an open-ended chain-engaging slot, through which said front chain section extends, said biasing unit including:
   a pressed vertical plate formed integrally on said disc and having an integral projection that extends therefrom in a direction toward said front chain section; and
   a coiled compression spring having a front end that is accommodated within said spring-retaining recess in said pushing piece, and a rear end that is sleeved on said projection of said vertical plate so as to bias said pushing piece forward, thereby tensioning said chain.

5. The wood planing machine as defined in claim 4, wherein said pushing piece has a horizontal upper protruding plate that extends integrally and forwardly from an upper end of said front end surface of said pushing piece, and two aligned horizontal lower protruding plates that extend integrally and forwardly from a lower end of said front end surface of said pushing piece and that are located on two sides of said upper protruding plate, thereby defining said chain-engaging slot between said upper protruding plate and said lower protruding plates.

6. The wood planing machine as defined in claim 5, wherein said pushing piece has a front end which is formed with left and right beveled edges that are disposed at two ends of said chain-engaging slot, thereby facilitating engagement between said chain and said chain-engaging slot.

7. The wood planing machine as defined in claim 1, further comprising a rotary lever that is fixed to an end of one of said left and right threaded rods for rotating said left and right threaded rods.

\* \* \* \* \*

UNITED STATES PATENT AND TRADEMARK OFFICE
CERTIFICATE OF CORRECTION

PATENT NO. : 6,298,887 B1
DATED : October 9, 2001
INVENTOR(S) : Chiu-Tsun Chang

It is certified that error appears in the above-identified patent and that said Letters Patent is hereby corrected as shown below:

Title page,
Title page, should be deleted and substitute the attached title page.

Figure 1:
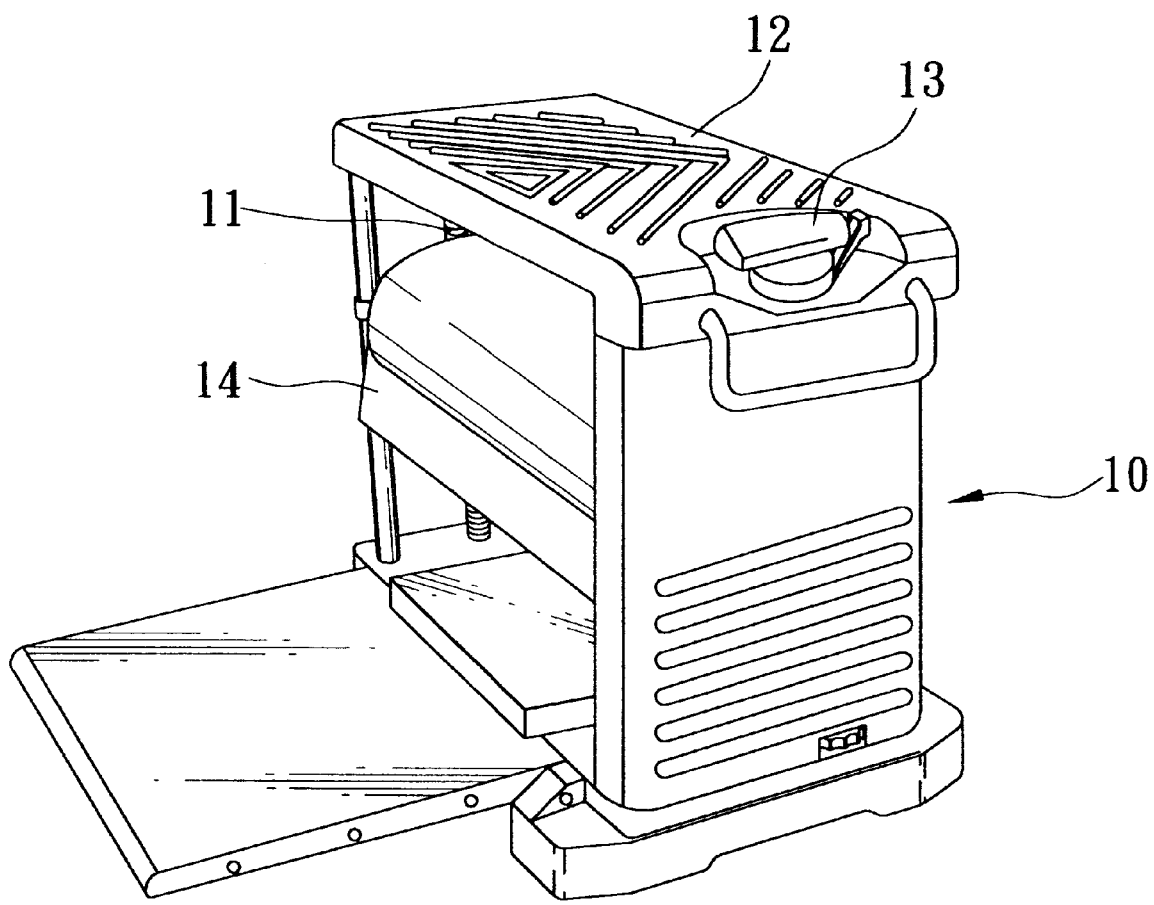
FIG. 1 is a perspective view of a conventional wood planing machine.
Figure 2:
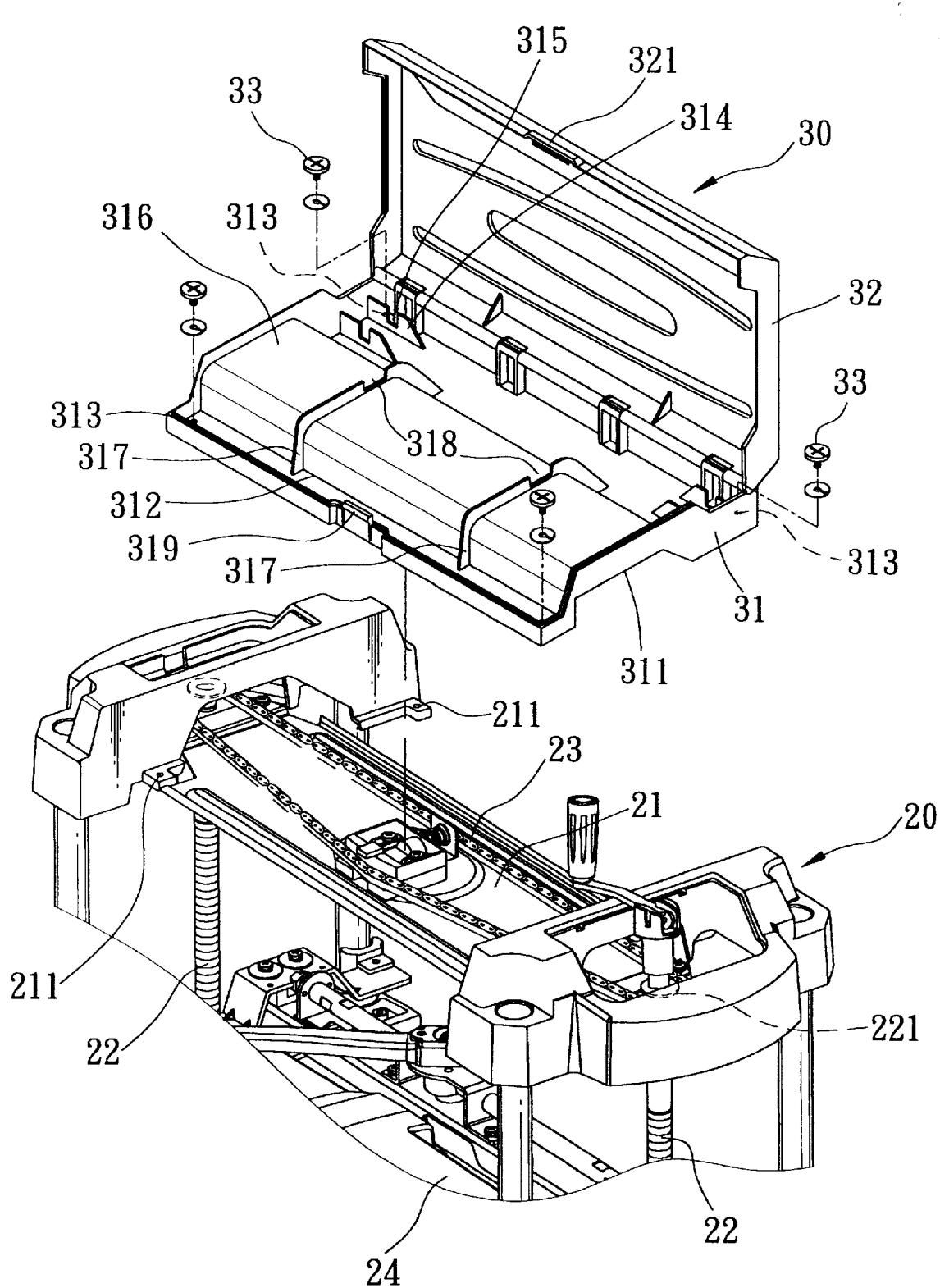
FIG. 2 is a bottom view of the conventional wood planing machine, illustrating how a chain tensioner device is employed therein.

Drawings,
Sheet 1, replace "Fig. 1" with new -- Fig. 1 --
Sheet 2, replace "Fig. 2" with new -- Fig. 2 --
Sheet 3, replace "Fig. 3" with new -- Fig. 3 --
Sheet 4, replace "Fig. 4" with new -- Fig. 4 -- as shown on attached pages.

Signed and Sealed this

Twenty-eighth Day of May, 2002

Attest:

JAMES E. ROGAN
Attesting Officer    Director of the United States Patent and Trademark Office

(12) United States Patent
Chang

(10) Patent No.: US 6,298,887 B1
(45) Date of Patent: Oct. 9, 2001

(54) WOOD PLANING MACHINE WITH AN AUTOMATIC CHAIN TENSIONER DEVICE

(75) Inventor: Chiu-Tsun Chang, Taichung (TW)

(73) Assignee: P & F Brother Industrial Corporation, Taichung (TW)

(*) Notice: Subject to any disclaimer, the term of this patent is extended or adjusted under 35 U.S.C. 154(b) by 0 days.

(21) Appl. No.: 09/664,310

(22) Filed: Sep. 18, 2000

(51) Int. Cl.[7] ........................................ B27C 1/00
(52) U.S. Cl. .................... 144/117.1; 144/114.1; 144/130; 254/133 R; 254/414
(58) Field of Search .................. 144/114.1, 117.1, 144/129, 130; 254/408, 413, 414, 133 R

(56) References Cited

U.S. PATENT DOCUMENTS 2,642,902 * 6/1953 Carey ........................ 144/129
4,456,042 * 6/1984 Clark et al. ................ 144/117.1

* cited by examiner

Primary Examiner—W. Donald Bray
(74) Attorney, Agent, or Firm—Baker Botts L.L.P.

(57) ABSTRACT

A wood planing machine includes a machine base having left and right mounting short sides, and feed-in and take-out long sides. Left and right pairs of posts are fixed on a top surface of the machine base at the left and right mounting short sides, respectively. A cutter carriage is disposed above the machine base, and has opposite end portions mounted respectively, vertically and movably on the posts. Left and right threaded rods are mounted respectively and rotatably on the mounting short sides of the machine base such that the threaded rods are disposed respectively between the left and right pairs of posts, and extend threadedly through opposite end portions of the cutter carriage for moving the cutter carriage along the posts. Two sprockets are sleeved respectively and fixedly on the left and right threaded rods. A chain has a front chain section and a rear chain section, and engages the sprockets so as to rotate the left and right threaded rods synchronously with each other. A chain tensioner device includes a pushing piece disposed movably inside the chain, and a biasing unit for biasing the pushing piece to contact and move the front chain section away from the rear chain section.

7 Claims, 7 Drawing Sheets